Oct. 9, 1956 F. R. LABIN 2,765,573
DEPTH GLIDERS
Filed Nov. 22, 1955

INVENTOR.
FRANK R. LABIN
BY
Beau, Brooks, Buckley & Beau
ATTORNEYS

United States Patent Office 2,765,573
Patented Oct. 9, 1956

2,765,573

DEPTH GLIDERS

Frank R. Labin, Miami, Fla.

Application November 22, 1955, Serial No. 548,342

2 Claims. (Cl. 43—43.13)

My invention relates in general to trolling devices and in particular to a depth glider for use in deep sea fishing.

The principal object of my invention is to provide a glider which is adjustable to the depth at which it is desired to fish and to the speed of travel during trolling.

Another object is to provide a device of this nature which shall maintain a true course through the water at the adjusted depth without a swaying motion.

Another object has been to provided a depth glider which greatly reduces the weight of sinkers necessary to fish at any desired depth.

Moreover, my device is provided with an inclined vane extending longitudinally through said body for giving an initial downward movement of the body until the desired depth has been reached and for maintaining the body at such depth in stabilizing manner.

The above objects and advantages have been accomplished by the device shown in the accompanying drawings, of which:

Figure 1:
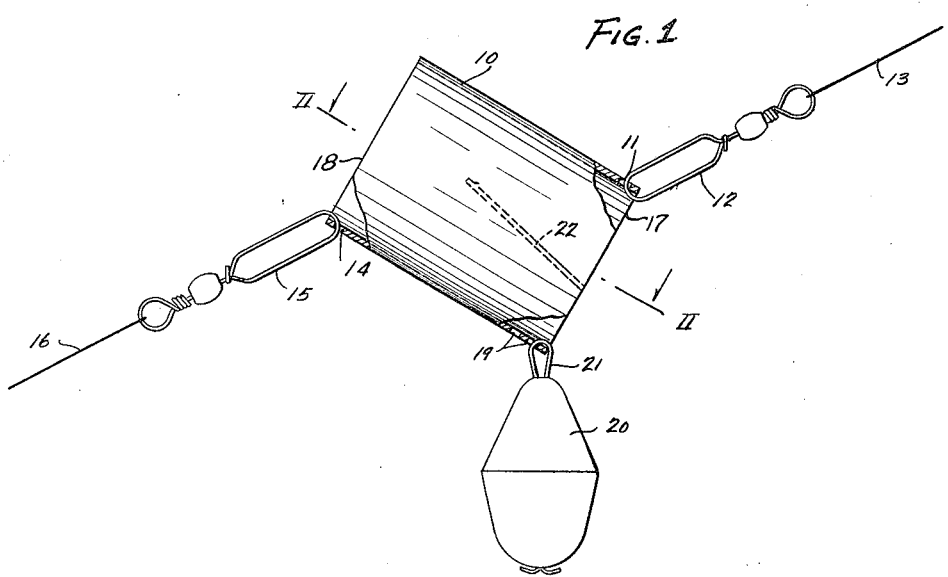
Fig. 1 is a side elevation of my device showing the position it will assume when in use.
Figure 2:
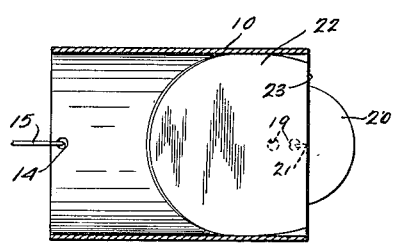
Fig. 2 is a sectional plan view taken on line II—II of Fig. 1.
Figure 3:
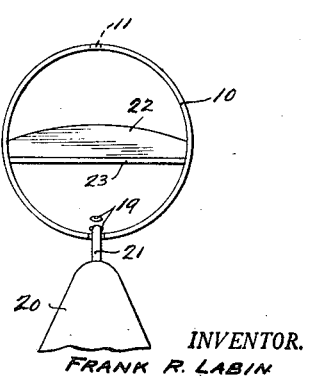
Fig. 3 is an end elevation of the device.

My invention comprises a body 10 tubular in form and having a length substantially greater than the diameter thereof. An aperture 11 is formed in the side wall at the advance end 17 thereof for the reception of the swivel 12 or the fishing line 13. In the diametrically opposite side of the body and at the trailing end 18 thereof is provided an aperture 14 for the reception of the swivels 15 of the leader 16 extending to the sinker or bait. A series of spaced apertures 19 are formed at the advance end of the body and are located diametrically opposite the aperture 11 for the attachment of a weight or sinker 20. The sinker is preferably carried by a removable wire 21 which may be engaged with any one of the apertures 19 to alter the depth to which the body will descend when trolling. All of the apertures just described are preferably in a plane passing through the axis of the body.

Mounted within the body is a vane 22 which is secured to the opposite sides of the inner surface of the wall of the body and which is inclined to the axis of the body toward the advance end thereof so that when the device is being drawn through the water, the advance edge 23 of the vane will be directed downwardly below the surface of the water to the desired depth. The weight 20 is so proportioned that when the device is traveling through the water, the body and, therefore, the vane will have its upper surface at increased inclination with the line of movement of the device when trolling. Since the weight 20 is adjustable by moving from one of the apertures 19 to another, the angle of incidence of the vane with the water may be altered slightly so as to govern the depth at which the device will be maintained.

From the foregoing, it will be obvious that when the device is placed in the water and is drawn forwardly by the fishing line 13, it will be carried downwardly into the water because of the inclination of the body and the vane and will assume a position substantially like that shown in Fig. 1. Depending upon the weight and adjustment of the sinker, the device will be carried down to the desired depth where it will be maintained during the trolling period. The function of the vane 22 is, as hereinbefore pointed out, to aid in directing the device downwardly into the water to the desired depth, but it also functions to stabilize the movement of the body as it is being drawn through the water thereby preventing undesirable swaying.

What is claimed is:

1. A depth glider for use in trolling, comprising a tubular body, means located at the top side of said body near the forward edge thereof for securing a fishing line thereto, a sinker adapted to be secured to the forward edge of said body at a point diametrically opposite the point of attachment of the fishing line, a leader attached to the trailing edge of said body on the same side as the attachment of said sinker, and a vane extending across the interior of said body and inclined downwardly toward the front thereof.

2. A depth glider for use in trolling, comprising a tubular body, said body having an advance end provided with an aperture for a fishing line at the top side thereof and a bottom side provided with a plurality of spaced sinker apertures, a fishing line secured to said fishing line aperture and a sinker adapted to be selectively secured to one of said sinker apertures, said body having a trailing end provided with a leader aperture on the same side thereof as the sinker apertures, and a vane carried by said body and extending longitudinally therethrough and inclined downwardly toward said advance end of said body.

References Cited in the file of this patent

UNITED STATES PATENTS 1,645,874     Sanford _____ Oct. 18, 1927

FOREIGN PATENTS 717,149     France _____ Oct. 19, 1931